United States Patent
Niebling et al.

(10) Patent No.: US 9,676,232 B2
(45) Date of Patent: Jun. 13, 2017

(54) WHEEL HUB WITH CENTERING DEVICE

(71) Applicant: Schaeffler Technologies GmbH & Co. KG, Herzogenaurach (DE)

(72) Inventors: Peter Niebling, Bad Kissingen (DE); Peter Partheymuller, Markgraitz (DE); Pavel Tseluyko, Schweinfurt (DE); Roland Langer, Schwanfeld (DE); Markus Reuter, Wurzburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 17 days.

(21) Appl. No.: 14/417,947

(22) PCT Filed: May 29, 2013

(86) PCT No.: PCT/EP2013/061032
§ 371 (c)(1),
(2) Date: Jan. 28, 2015

(87) PCT Pub. No.: WO2014/019737
PCT Pub. Date: Feb. 6, 2014

(65) Prior Publication Data
US 2015/0165819 A1    Jun. 18, 2015

(30) Foreign Application Priority Data
Aug. 1, 2012  (DE) .......................... 10 2012 213 527

(51) Int. Cl.
*B60B 27/02* (2006.01)
*B60B 27/00* (2006.01)

(52) U.S. Cl.
CPC .............. *B60B 27/02* (2013.01); *B60B 27/00* (2013.01); *B60B 27/0052* (2013.01); *B60B 27/0094* (2013.01); *B60B 2900/111* (2013.01)

(58) Field of Classification Search
CPC  B60B 27/02; B60B 27/0094; B60B 2900/111
(Continued)

(56) References Cited

U.S. PATENT DOCUMENTS 5,333,939 A  *  8/1994  Krude ................. B60B 27/0005
                                                         301/124.1
5,590,967 A  *  1/1997  Kapaan ................ F16C 19/166
                                                         384/448
(Continued)

FOREIGN PATENT DOCUMENTS

CN         2037320       5/1989
CN       102256720      11/2011
(Continued)

*Primary Examiner* — S. Joseph Morano
*Assistant Examiner* — Jean Charleston
(74) *Attorney, Agent, or Firm* — Volpe and Koenig, P.C.

(57) ABSTRACT

A wheel hub (1) having a radially extending wheel flange (17) which has fastening holes (3), having a cylindrical projection which extends from the wheel flange (17) axially on the vehicle side and which serves for at least partially receiving a rolling bearing, and having a centering device which is mounted axially on the wheel side. A high rigidity of the wheel hub (1) and/or of the wheel bearing unit is realized with little material usage. One possibility arises by the centering device of a wheel hub being regarded as the product of the compromise between rigidity and possible material removal. In this regard, a particular arrangement of the webs that form the centering device is provided which leads to a particularly advantageous solution, specifically by virtue of the webs (7) being oriented in the same radial direction (A, B) as the fastening holes (3) of the wheel flange (17).

13 Claims, 3 Drawing Sheets

(58) Field of Classification Search
USPC ............ 301/105.1, 124.1; 384/544, 589, 448
See application file for complete search history.

(56) References Cited

U.S. PATENT DOCUMENTS

| | | | |
|---|---|---|---|
| 8,029,195 B2* | 10/2011 | Seo | ........................ B60B 27/00 |
| | | | 384/492 |
| 2004/0017104 A1* | 1/2004 | Fakhoury | ................ B60B 27/02 |
| | | | 301/105.1 |
| 2005/0018939 A1* | 1/2005 | Niwa | ...................... B60B 27/00 |
| | | | 384/544 |
| 2005/0073190 A1 | 4/2005 | Wakisaka et al. | |
| 2006/0244303 A1* | 11/2006 | Savarese | ................ B60B 27/00 |
| | | | 301/35.627 |
| 2010/0098367 A1* | 4/2010 | Hirai | ...................... B60B 27/00 |
| | | | 384/544 |
| 2011/0241416 A1 | 10/2011 | Kaiser et al. | |

FOREIGN PATENT DOCUMENTS

| | | | | |
|---|---|---|---|---|
| DE | 102005061389 | | 8/2007 | |
| DE | 102009015950 | | 9/2010 | |
| EP | 1500524 | | 1/2005 | |
| JP | H09323501 | | 12/1997 | |
| JP | EP 1500524 A2 * | | 1/2005 | ............. B60B 27/00 |
| NL | WO 2010012283 A1 * | | 2/2010 | ......... B60B 27/0005 |
| WO | 2010012283 | | 2/2010 | |

* cited by examiner

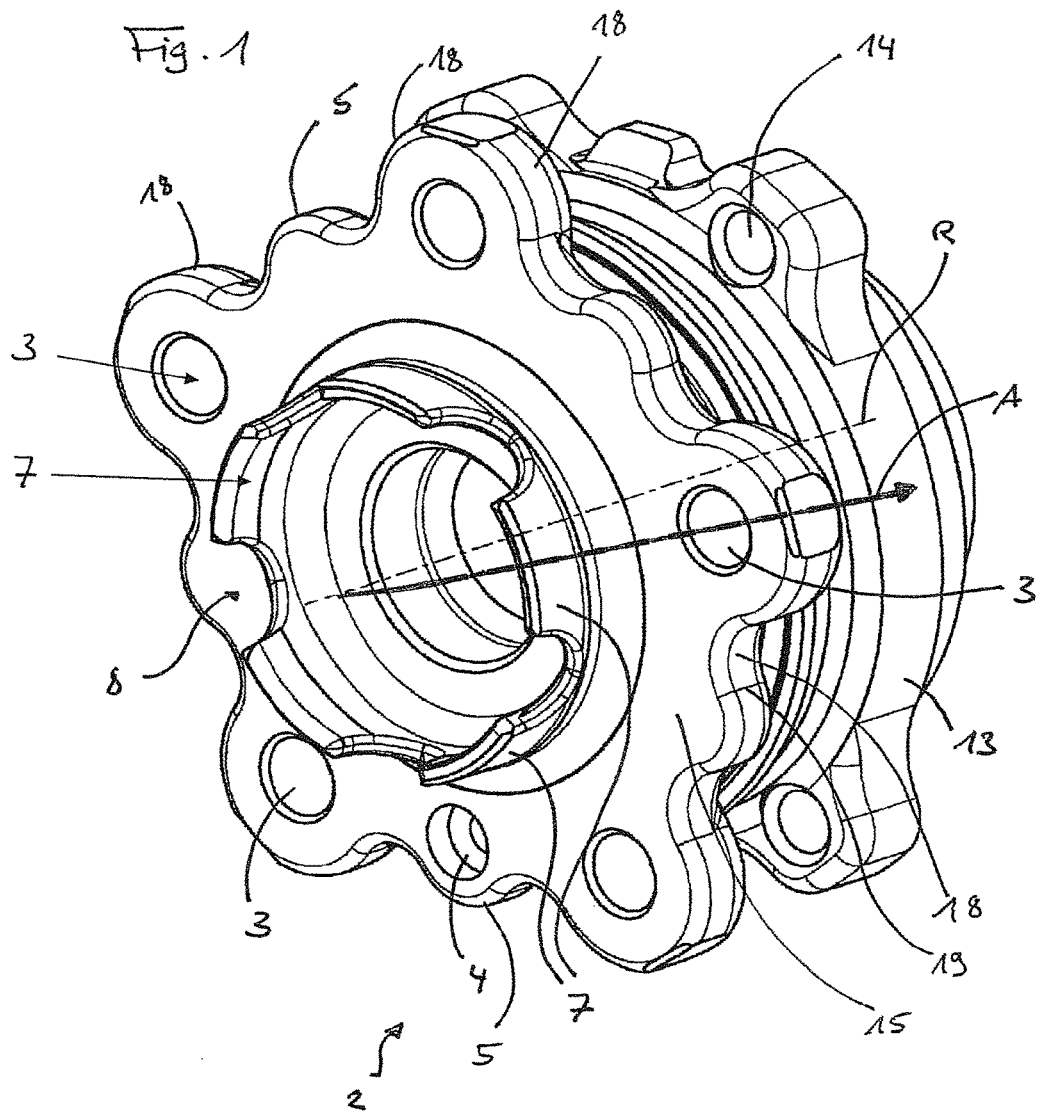

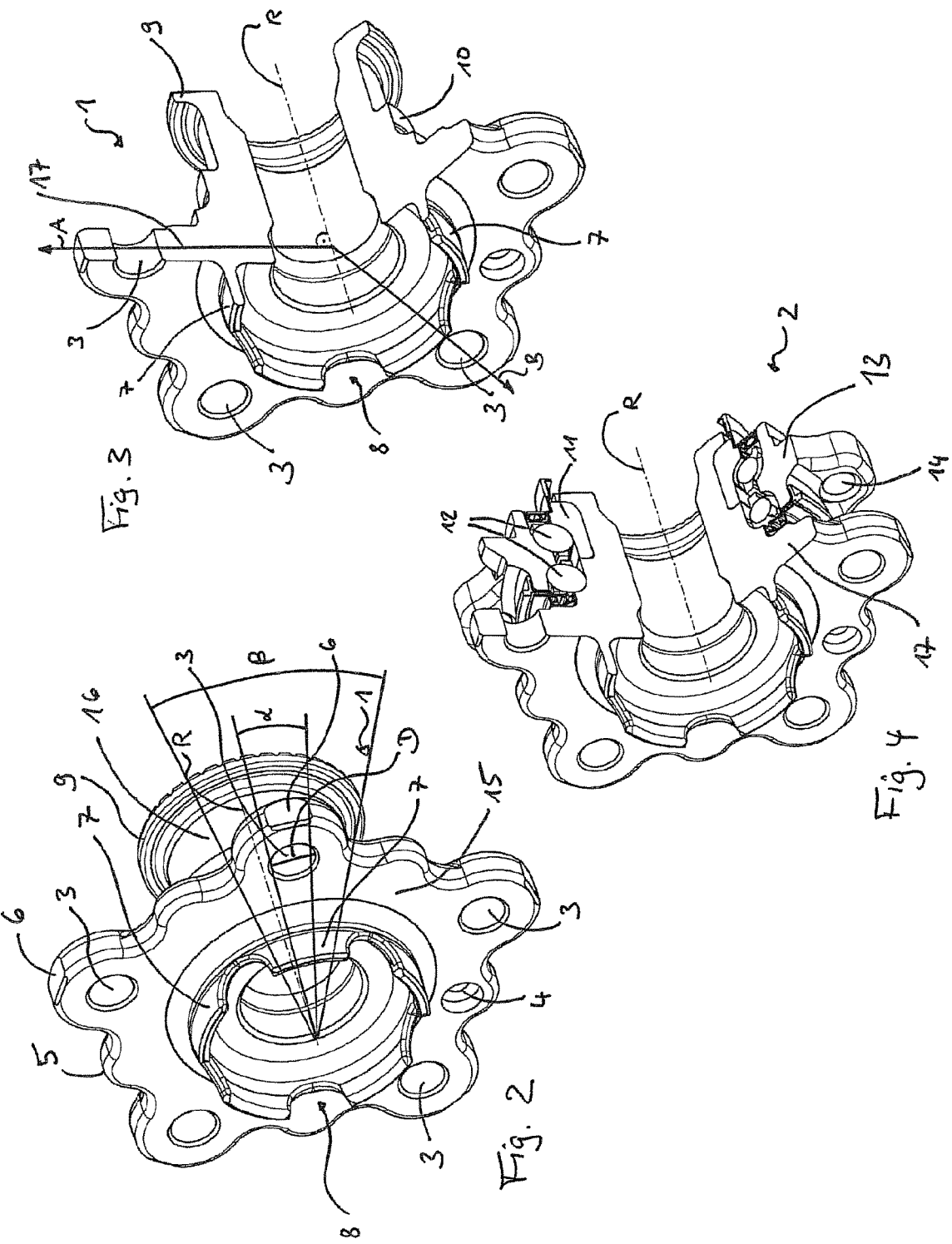

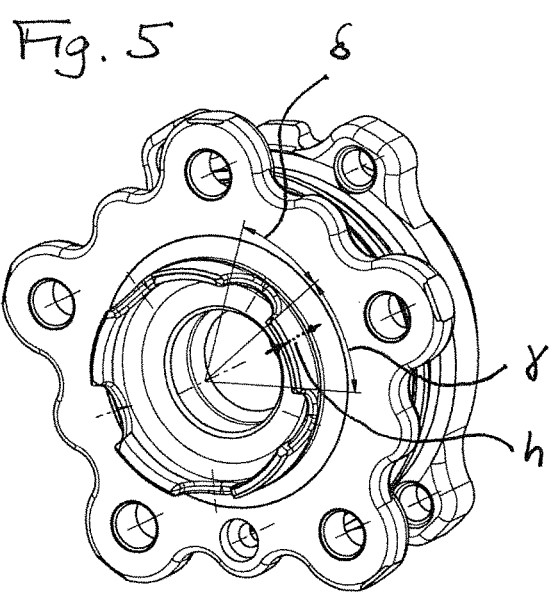

WHEEL HUB WITH CENTERING DEVICE

BACKGROUND

The invention relates to a wheel hub with a wheel flange that extends in the radial direction and has fastening holes, with a cylindrical projection extending from the wheel flange in the axial direction on the vehicle side for at least partial holding of a rolling bearing, and with a centering device that is arranged concentric to the rotational axis of the wheel hub in the axial direction on the wheel side and is provided for holding a wheel rim and/or a brake disk. The invention also relates to a wheel bearing unit with a wheel hub of this type.

Such a wheel hub or wheel bearing unit is used in the automotive field, in particular, in passenger cars. The wheel flange with centering device typically forms the interface for the rim or brake disk and allows the rim of a wheel to be centered on the wheel hub as easily as possible and then fastened.

A centering device on a wheel hub is typically realized by a hollow cylindrical body that is arranged axially on the wheel flange and is suitable for moving the rim/disk brake in the axial direction along the rotational axis. If the wheel rim is set on the centering device, then there is no further movement in the radial direction, which makes it possible to turn the wheel rim to the correct fastening position about the centering device until the fastening holes of the rim are aligned with the fastening holes of the wheel flange. Typically, the fastening holes of the wheel flange have an internal thread so that a positive and/or non-positive connection of the rim to the wheel flange can be created by bolts by inserting the fastening bolts through the fastening holes in the rim into the corresponding fastening holes of the wheel flange and tightening them there.

Such centering devices are already known in the prior art, for example, there is the patent application DE 10 2005 061 389 A1 in which just such a cylindrical projection is used as a centering device on a wheel hub.

On one hand, there is the desire to guarantee the simplest possible wheel assembly by using the centering device described above, but equally there is the desire for a wheel hub that has a very low weight and nevertheless can provide the required strength. Saving weight is also a central theme in the patent application cited above, wherein the wheel flange is provided as such with corresponding recesses that affect the stiffness only slightly or not at all and simultaneously provide for weight savings.

SUMMARY

The invention is based on the objective of providing a wheel hub with a simple fastening option for brake disks and/or rims, wherein the wheel hub should have a lightweight construction and also sufficient strength with low weight.

This objective is met for a wheel hub of the type noted above in that the centering device is formed from connecting pieces that are separated from each other in the circumferential direction by recesses. Here, the removed material causes the weight savings.

The invention is based on the knowledge that the centering device must not be a cylindrical centering device that is uninterrupted in the circumferential direction, but instead is to be provided merely to be able to hold the hollow cylindrical fitting of the rim/brake disk. Thus, the centering device, as far as the holding function is not affected, can be used for an optimal compromise between weight, strength, and stiffness of the wheel hub.

The wheel hub according to the invention has a wheel flange that extends in the radial direction and has fastening holes and is provided for fastening the rim of the wheel. In addition, the wheel hub has a cylindrical projection that extends from the wheel flange in the axial direction on the vehicle side for at least partial holding of a rolling bearing. Here it is possible that the projection itself forms a rolling body raceway or is provided for holding at least one bearing ring or multiple bearing rings that form a rolling body raceway.

The centering device is arranged concentric to the rotational axis of the wheel hub in the axial direction on the wheel side. This is provided in this respect for holding the wheel rim, how the centering device can be used as an axial guide and radial centering for the installation for the rim. The wheel flange has an axial contact surface in the plane of the openings of the fastening bores, wherein the plane is used as an axial contact surface for the rim. Below, the terms fastening bores and fastening holes are used synonymously, because fastening holes are usually created by drilling.

According to the invention it is provided that the centering device is formed from connecting pieces that are separated from each other in the circumferential direction by recesses. Here, the connecting pieces have a partial segment of a cylindrical surface on the outside in the radial direction, with the curvature of this surface being defined by the outer radius of the formed centering device. This radius extends from the rotational axis of the wheel hub up to the outer surface of a connecting piece. The number of connecting pieces and their length in the circumferential direction can vary. If strict requirements are not placed on the stiffness of the wheel hub, then it is definitely possible that only three connecting pieces are sufficient for guaranteeing a centering function. For wheel hubs for passenger cars, usually five connecting pieces and five fastening holes provide best suitability. Ideally, the number of connecting pieces corresponds to the number of fastening holes. Here, the recesses can be selected with corresponding sizes between the connecting pieces so that a large weight is not produced.

Advantageously, the circumferential lengths of the connecting pieces correspond to a specified arc measure of the rotational angle. For example, a connecting piece could correspond to $\pi/3$ or 60 degrees if one assumes that the centering device is formed by three connecting pieces that are separated from each other by three recesses and the connecting pieces and also the recesses have the same circumferential length. If one assumes, for example, a wheel flange that has five fastening holes, then the centering device could be formed from five connecting pieces and five recesses that all have, for example, the same arc measure of $\pi/5$ or 36 degrees. Alternatively, the recesses could also be selected larger or smaller, wherein an angle $\delta$ for the recesses of 32 degrees and an angle $\gamma$ for the connecting pieces of 40 degrees have proven effective. In this way, a strength-optimized centering device is produced, whose recesses have a smaller length than the connecting pieces in the circumferential direction. The strength can be further optimized in that the connecting piece belonging to the fastening hole is arranged radially closer to the fastening hole than to the rotational axis of the wheel hub.

In one advantageous embodiment, a first connecting piece is arranged in a first radial direction of a first fastening hole of the wheel flange, and a second connecting piece is arranged in a second radial direction. This is then advantageous if, in addition to the weight reduction, the stiffness should also play a role. Because the wheel flange extends farthest in the radial direction in all designs of the wheel hub, lever forces occur during operation that must be received by the wheel hub. These lever forces are introduced from the rim via the bolts and the fastening holes into the wheel flange.

A radial direction is understood to be a direction in a plane of rotation that is oriented outward from the rotational axis in the radial direction. Thus, a radial direction is always perpendicular to the rotational axis. The stiffness can now be increased in that a connecting piece lies in the same radial direction as a fastening hole of the wheel flange. The connecting piece is usually offset in the axial direction from the fastening hole, but in the radial direction, said connecting piece lies between the rotational axis and the associated fastening hole. In other words, the axial offset is here ignored. For force transfer, the lever force runs essentially in the radial direction in the direction of the rotational axis, wherein the connecting piece can have a strength-increasing effect from the outside exactly at the location where the force runs in the wheel flange.

Advantageously, the first and second connecting pieces enclose a first opening angle in the plane of the axial contact surface of the wheel flange or in a plane parallel to said plane. Here, this first opening angle is defined by the diameter of the fastening hole. In other words, the first opening angle is formed partially by a first leg that lies in the plane of rotation and has its origin at the rotational axis. Furthermore, the first leg is tangent to the cylindrical shape of the fastening hole on one side. The second leg of the first opening angle similarly lies in the plane of rotation, has its origin in the rotational axis, and is tangent to the cylindrical shape of the fastening hole on the other side. Together with the diameter of the fastening hole, the two legs form an equilateral triangle.

Advantageously, the first and second connecting pieces enclose a second opening angle that is defined by the width of a hole receptacle in the circumferential direction. A hole receptacle has the function of preventing a fastening hole from tearing, in that the movement forces are dissipated inward into the wheel flange in the radial direction. Thus, the hole receptacle is also to be considered as a force transmission element when designing the connecting pieces depending on the application. The hole receptacle is defined by the material defining the fastening hole, wherein this material cannot be eliminated for the required force transmission. The hole receptacle is defined on the outside in the radial direction by one or more outer radii that form a material-reinforcing holder for the fastening bolt. On the inside in the radial direction, the hole receptacle transitions continuously into the wheel flange body.

In one advantageous embodiment, adjacent hole receptacles of the wheel flange cover the same angle, in particular, an angle of 90 degrees or 72 degrees, in a plane of rotation. Because the plane of the axial contact surface of the wheel flange is usually arranged perpendicular to the rotational axis, this optionally forms one of the previously mentioned planes of rotation. The specified angles represent optimal solutions for the use of four and five bolts, respectively, which must be equipped with the corresponding connecting pieces.

Advantageously, the number of connecting pieces is equal to the number of fastening holes of the wheel flange, wherein an even-number multiple, optionally with recesses of different sizes between the connecting pieces, is also conceivable. This usually has an advantageous effect on the production of the wheel hub and also leads to advantages at other points, e.g., for packaging. However, especially for stiffness, there is the advantage that in each radial direction that can be allocated to a fastening hole, a connecting piece is also arranged that is used for receiving the radial forces.

Advantageously, for a plurality of fastening holes, each fastening hole of the wheel flange can be allocated to a connecting piece that is arranged in the same radial direction as the associated fastening hole. Here, the number of connecting pieces can be greater than the number of fastening holes.

In addition, the constructions of the recesses between the connecting pieces can contribute to a compromise between low weight and stiffness. For example, the recesses or also only selected recesses could form a rounded section between the adjacent connecting pieces. This rounded section transfers forces much better from one connecting piece to the next, especially if the rounded section forms, at each of the connecting pieces, grooves that are optionally combined into a single rounded section. Here, the rounded section or a part of this rounded section can form the base of the recess that forms, together with the two adjacent connecting pieces, a rounded hole open in the axial direction.

Another advantageous construction provides arranging the base of the recess in the plane of the axial contact surface of the wheel flange or parallel to this plane. Here, stresses are also considered that lead from the wheel flange into the connecting pieces and thus can be received optimally. If necessary, only one part of the base is in the plane of the axial contact surface. This produces an advantage in terms of production. Alternatively, the stiffness could be increased in that the bases are not in the axial contact surfaces, but instead are offset in the axial direction from these surfaces. This means that the connecting pieces have, at their transition from the wheel flange, first a cylindrical shape that is continuous in the circumferential direction. However, in the axial direction it is then adjacent to the centering device that is described above and is formed by the connecting pieces and also has recesses.

The wheel hub according to the invention can advantageously be inserted into wheel bearing units that have a roller bearing on the cylindrical projection extending from the wheel flange on the vehicle side in the axial direction, wherein the roller bearing is, in particular, a two-row or multi-row angular contact ball bearing. Here, bearing rings or at least one bearing ring can be held or pre-tensioned by a cold-formed roller rivet collar.

Other advantageous constructions and preferred refinements of the invention are to be taken from the description of the figures and/or the dependent claims.

The invention is described and explained in more detail below using embodiments shown in the figures.

BRIEF DESCRIPTION OF THE DRAWINGS

Shown are:

FIG. 1 a wheel bearing unit with a wheel hub with five fastening holes and the associated connecting pieces of the centering device, FIG. 2 the wheel hub from FIG. 1, FIG. 3 the wheel hub from FIG. 1 in a sectioned view, FIG. 4 the wheel bearing unit from FIG. 1 in a sectioned view, and FIG. 5 the wheel bearing unit from FIG. 1 with opening angles of the connecting pieces and recesses in the centering device.

DETAILED DESCRIPTION OF THE PREFERRED EMBODIMENTS

FIG. 1 shows a wheel bearing unit 2 with a star-shaped wheel hub, a centering device with 5 connecting pieces 7, and the recesses 8 lying in-between, and a roller bearing mounted on the wheel hub.

The wheel bearing unit 2 can be bolted on a wheel carrier with the use of the fastening hole 14 on the outer ring 13 of the wheel bearing unit 2. Here, the position of the wheel flange 17 is not important, because the intermediate spaces in the circumferential direction between the fastening holes 3 of the wheel flange 17 are designed with such little material that a bolt can be bolted into a fastening hole 14 nearly independently from the position of the wheel flange 17.

The connecting pieces 7 each lie between a fastening hole 3 of the wheel flange 17 and the rotational axis R. The connecting pieces 7 raise in the axial direction above the axial contact surface 15 of the wheel flange 17, but lie in the radial direction in the same direction as also the associated fastening holes 3. This is indicated, for example, with the radial direction A that is shown schematically as an arrow in FIG. 1. The connecting pieces 7 are arranged in the radial direction essentially in the center between the rotational axis R and the associated fastening hole 3.

The connecting pieces form a cylindrical centering device; they are separated from each other in the circumferential direction by round holes that are oriented in the radial direction and open in the axial direction. In this embodiment, the round holes form the recesses 8.

Otherwise, the recesses 8 could also assume other shapes. For example, the base of the recesses 8 could lie in the surface of the axial contact surface 15 and the flanks of the connecting pieces oriented in the circumferential direction could be parallel to each other, wherein a rectangular recess 8 would be created that is easy to produce, but has lower stiffness than the solution shown in the figures. Alternatively, the recesses could also have a V-shape in which together the flanks form an angle that is open in the axial direction. The latter embodiment is especially simple to produce.

The axial length of the connecting pieces 7 is not significant, with an equal height for all connecting pieces 7 being the simplest to handle.

The wheel flange 17 is defined in its radial outer area by different radii. These radii can be equal in magnitude, but to that effect consider that parts 18 are oriented both convexly and also concavely outward in the radial direction. The parts 18 are delimited from each other by separating lines 19 and make the shaping of the star-shaped wheel flange 17 especially simple.

The hole receptacles 6 surround the fastening holes 3 in the radial direction and are formed by two successive convex parts 18. In the rest of the outer area of the wheel flange 17, convex and concave parts 18 alternate. In this way, an intermediate raised section 5 that contributes overall to the stiffness of the wheel bearing flange 17 is formed between two adjacent fastening holes 3.

In one of the intermediate raised sections 5 there is a hole 4 that is provided for the fastening of a brake disk.

FIG. 2 shows the wheel hub 1 of the wheel bearing unit 2 from FIG. 1. The connecting piece 7 can cover, in one special embodiment, the first opening angle $\alpha$ that is defined by the two legs that have their origin at the rotational axis R and are tangent to the fastening hole 3 of the wheel flange 17 in a plane of rotation. The shown connecting piece 7 surpasses this first opening angle by far, so that the wheel hub 1 indeed has a higher weight, but better stiffness. Even the second opening angle $\beta$ is covered by the connecting pieces 7, wherein the second opening angle $\beta$ is defined by the arc measure of the hole receptacle 6. For lower weight wheel hubs, the connecting pieces 7 can be reduced so that their arc measure corresponds either to the first or the second opening angle $\alpha$, $\beta$ or lies between these two angles.

FIG. 3 shows the wheel hub 1 from FIG. 2 in a sectioned view, wherein the roller rivet collar 9 can be seen that can hold the inner ring 11 (see FIG. 4) and can pretension the roller bearing.

The wheel hub 1 further forms a roller body raceway 10 that forms part of the roller bearing on the cylindrical projection extending from the wheel flange in the axial direction on the vehicle side.

In FIG. 3, with reference to the section through the fastening hole 3, it can be seen that the connecting piece 7 is arranged in the radial direction A with respect to the rotational axis R, exactly like the cut fastening hole 3.

FIG. 4 shows a sectioned view of the wheel bearing unit 2 that is constructed as an angular contact ball bearing unit and has two roller body rows 12 that are pre-tensioned by means of the inner ring 11 and outer ring 13 relative to the wheel hub 1 such that these can be bolted on a not-shown wheel carrier by means of the fastening holes 14, without performing a pretensioning or pretensioning correction of the roller bearing.

FIG. 5 emphasizes a special combination of an opening angle for connecting pieces and recesses. The wheel hub has a centering device that has a height h of 10 millimeters and is formed by five connecting pieces and five recesses, wherein the opening angle $\gamma$ that can be allocated to the connecting pieces 7 equals 40 degrees and the opening angle $\delta$ that can be allocated to the recesses equals 32 degrees. This embodiment has proven itself to be a practical solution.

In the shown embodiments, the number of recesses 8 in the rim seat area of the wheel hub 1 corresponds to the number of fastening holes 3 on the wheel flange 17. This, however, is not necessarily the case, just as many intermediate connecting pieces could be provided that could be allocated to no fastening hole. In this way, an increased component stiffness of the wheel hub is similarly achievable.

In summary, the invention relates to a wheel hub with a wheel flange extending in the radial direction and having fastening holes, with a cylindrical projection extending from the wheel flange on the vehicle side in the axial direction for at least partial holding of a roller bearing and with a centering device formed on the wheel side in the axial direction. The declared goal of the invention is to achieve a high stiffness of the wheel hub or the wheel bearing unit with low use of materials. One possibility is created in that the centering device of a wheel hub is identified as the object for compromise between stiffness and possible material recesses. For this purpose, a special arrangement of the connecting pieces forming the centering device is proposed, leading to an especially advantageous solution, namely, in that the connecting pieces are oriented in the same radial direction and also the fastening holes of the wheel flange.

LIST OF REFERENCE NUMBERS

A First radial direction of a fastening hole of the wheel flange
B Second radial direction of another fastening hole of the wheel flange
D Diameter of the fastening hole h Axial height of the centering device
R Rotational axis
α First opening angle
β Second opening angle
δ Opening angle of the recesses
γ Opening angle of the connecting pieces
1 Wheel hub
2 Wheel bearing unit
3 Fastening hole
4 Brake disk fastening hole
5 Intermediate raised section
6 Hole receptacles
7 Connecting piece
8 Recess
9 Rolling contact rivet collar
10 Raceway of the rolling bodies
11 Inner ring
12 Roller body
13 Outer ring
14 Fastening hole of the fastening flank
15 Axial contact surface
16 Cylindrical projection
17 Wheel flange
18 Rounded part
19 Partition line

The invention claimed is:

1. A wheel hub comprising: a wheel flange that extends in a radial direction and has fastening holes, a cylindrical projection extending in an axial direction on a vehicle side from the wheel flange for at least partial holding of a rolling contact bearing, and a centering device formed integrally with the wheel flange is arranged on a wheel side in the axial direction and is arranged concentric to a rotational axis (R) of the wheel hub for holding a wheel rim or brake disk, the centering device is formed from connecting pieces that are separated from each other in a peripheral direction by recesses, and the wheel flange includes a varying outer diameter, the wheel flange includes a first plurality of radially extending portions that include the fastening holes, the first plurality of radially extending portions define a first outer diameter, and the wheel flange includes a second plurality of radially extending portions each spaced between respective pairs of the first plurality of radially extending portions, the second plurality of radially extending portions define a second outer diameter that is less than the first outer diameter.

2. The wheel hub according to claim 1, wherein in a first radial direction (A) of a first one of the fastening holes of the wheel flange, a first one of the connecting pieces is arranged and in a second radial direction (B) a second one of the connecting pieces is arranged.

3. The wheel hub according to claim 2, wherein the first and the second connecting pieces cover, in a plane of an axial contact surface of the wheel flange or a plane parallel thereto, a first opening angle (a) that is defined by a diameter of the fastening hole associated with each of the connecting pieces.

4. The wheel hub according to claim 3, wherein adjacent hole receptacles of the wheel flange span an equal angle, in the plane of the axial contact surface.

5. The wheel hub according to claim 2, wherein the first and second connecting pieces cover, in a plane of an axial contact surface of the wheel flange or a plane parallel thereto, a second opening angle (13) that is defined by a width of a hole receptacle in a peripheral direction.

6. The wheel hub according to claim 1, wherein the connecting pieces are arranged in the fastening holes of the wheel flange in the radial direction with respect to the rotational axis (R).

7. The wheel hub according to claim 1, wherein a number of the connecting pieces is equal to a number of the fastening holes of the wheel flange or forms a whole-number multiple and several of the connecting pieces are allocated to one of the fastening holes.

8. The wheel hub according to claim 7, wherein, for a plurality of the fastening holes of the wheel flange, one of the connecting pieces is allocated to one of the fastening holes, and said connecting piece is arranged in the same radial direction (a) as the associated fastening hole.

9. The wheel hub according to claim 1, wherein at least one recess forms a rounded section between two adjacent connecting pieces or a base of the recess is arranged in a plane of an axial contact surface of the wheel flange or parallel to said plane.

10. A wheel bearing unit comprising a wheel hub according to claim 1.

11. The wheel hub according to claim 1, wherein one of the second plurality of radially extending portions includes a through hole, and the through hole is radially offset from the fastening holes.

12. The wheel hub according to claim 1, wherein the wheel flange is star-shaped.

13. The wheel hub according to claim 1, wherein the varying outer diameter of the wheel flange is partially defined by alternating radially concave portions and radially convex portions.

* * * * *